United States Patent
Ohashi

(10) Patent No.: US 10,055,081 B2
(45) Date of Patent: Aug. 21, 2018

(54) ENABLING VISUAL RECOGNITION OF AN ENLARGED IMAGE

(71) Applicant: Sony Corporation, Tokyo (JP)

(72) Inventor: Hisashi Ohashi, Chiba (JP)

(73) Assignee: Sony Corporation, Tokyo (JP)

( * ) Notice: Subject to any disclaimer, the term of this patent is extended or adjusted under 35 U.S.C. 154(b) by 607 days.

(21) Appl. No.: 13/776,756

(22) Filed: Feb. 26, 2013

(65) Prior Publication Data
US 2013/0239050 A1 Sep. 12, 2013

(30) Foreign Application Priority Data
Mar. 8, 2012 (JP) ................................. 2012-051829

(51) Int. Cl.
*G06F 3/0481* (2013.01)
*G06F 3/14* (2006.01)
*G09G 5/14* (2006.01)

(52) U.S. Cl.
CPC .............. *G06F 3/0481* (2013.01); *G06F 3/14* (2013.01); *G09G 5/14* (2013.01); *G09G 2340/045* (2013.01); *G09G 2340/0464* (2013.01); *G09G 2340/12* (2013.01)

(58) Field of Classification Search
CPC ...................................................... G06F 3/0481
See application file for complete search history.

(56) References Cited

U.S. PATENT DOCUMENTS

| | | | | |
|---|---|---|---|---|
| 5,581,670 A | * | 12/1996 | Bier | G06F 3/0481 345/629 |
| 5,621,904 A | * | 4/1997 | Elliott et al. | 715/798 |
| 5,675,755 A | * | 10/1997 | Trueblood | G06F 3/0481 715/791 |
| 5,818,455 A | * | 10/1998 | Stone | G06T 3/0018 345/619 |
| 5,999,191 A | * | 12/1999 | Frank | G06F 3/0481 345/634 |
| 6,201,548 B1 | * | 3/2001 | Cariffe | G06T 11/60 345/620 |
| 6,572,476 B2 | * | 6/2003 | Shoji | A63F 13/04 345/472 |
| 6,590,583 B2 | * | 7/2003 | Soohoo | G06T 3/0025 345/660 |
| 8,120,624 B2 | * | 2/2012 | Jetha | G06F 3/0481 345/647 |
| 2003/0142132 A1 | * | 7/2003 | Brown | G06F 3/0481 715/768 |
| 2003/0142137 A1 | * | 7/2003 | Brown | G06F 3/0362 715/786 |
| 2006/0071947 A1 | * | 4/2006 | Ubillos | G06F 3/0481 345/648 |
| 2006/0271875 A1 | * | 11/2006 | Green | G06F 3/038 715/768 |

(Continued)

FOREIGN PATENT DOCUMENTS

JP 11-065769 A 3/1999

*Primary Examiner* — Amy M Levy
(74) *Attorney, Agent, or Firm* — Chip Law Group

(57) ABSTRACT

There is provided a display control device including a display control unit that superimposes and displays a sub-screen in which a partial image displayed in a partial region of an input image displayed on a display unit is enlarged and displayed on the input image in a manner that the sub-screen does not overlap with the partial region.

18 Claims, 7 Drawing Sheets

MAKE IMAGE OF SUB-SCREEN OTHER THAN LATEST ONE TRANSPARENT

(56) References Cited

U.S. PATENT DOCUMENTS

| | | | | |
|---|---|---|---|---|
| 2006/0294475 | A1* | 12/2006 | Holecek | G06F 3/0481 |
| | | | | 715/781 |
| 2008/0057941 | A1* | 3/2008 | Scott | G06F 1/1626 |
| | | | | 455/425 |
| 2008/0178126 | A1* | 7/2008 | Beeck | G06F 3/017 |
| | | | | 715/863 |
| 2008/0195969 | A1* | 8/2008 | Brown | G06F 3/0486 |
| | | | | 715/802 |
| 2009/0167966 | A1* | 7/2009 | Nam et al. | 349/5 |
| 2009/0295998 | A1* | 12/2009 | Nobori | H04N 5/44591 |
| | | | | 348/565 |
| 2010/0050081 | A1* | 2/2010 | Lee et al. | 715/719 |
| 2012/0120277 | A1* | 5/2012 | Tsai | H04N 5/23293 |
| | | | | 348/223.1 |
| 2013/0120434 | A1* | 5/2013 | Kim | G06F 3/04883 |
| | | | | 345/594 |

* cited by examiner

LEAVE ONLY LATEST SUB-SCREEN

MAKE IMAGE OF SUB-SCREEN OTHER THAN LATEST ONE TRANSPARENT

ENABLING VISUAL RECOGNITION OF AN ENLARGED IMAGE

BACKGROUND

The present disclosure relates to a display control device, display control method, and a computer-readable recording medium.

User interfaces including touch panels with which a user can operate applications using an input object such as a finger, or the like are in general use. Instantaneous operations are possible by such user interfaces, and accordingly, operability can be improved. For example, Japanese Unexamined Patent Application Publication No. H11-65769 discloses a method in which a position at which an input image is desired to be enlarged is instructed with an input object using such a user interface and an enlarged image is displayed near the position.

SUMMARY

However, in the image enlargement method of Japanese Unexamined Patent Application Publication No. H11-65769, it is difficult to visually recognize an enlarged video since the enlargement position is instructed with a finger.

Thus, in the present disclosure, a novel and improved display control device, display control method, and computer-readable recording medium which enable visual recognition of an enlarged video while the whole image is observed.

According to an embodiment of the present disclosure, there is provided a display control device including a display control unit that superimposes and displays a sub-screen in which a partial image displayed in a partial region of an input image displayed on a display unit is enlarged and displayed on the input image in a manner that the sub-screen does not overlap with the partial region.

Further, according to an embodiment of the present disclosure, there is provided a display control method including superimposing and displaying a sub-screen in which a partial image displayed in a partial region of an input image displayed on a display unit is enlarged and displayed on the input image in a manner that the sub-screen does not overlap with the partial region.

Further, according to an embodiment of the present disclosure, there is provided a computer-readable recording medium having a program recorded therein, the program configured to cause a computer to function as a display control device including a display control unit that superimposes and displays a sub-screen in which a partial image displayed in a partial region of an input image displayed on a display unit is enlarged and displayed on the input image in a manner that the sub-screen does not overlap with the partial region.

According to the embodiment of the present disclosure as described above, an enlarged video can be visually recognized while the whole image is observed.

DETAILED DESCRIPTION OF THE EMBODIMENT(S)

Figure 1:
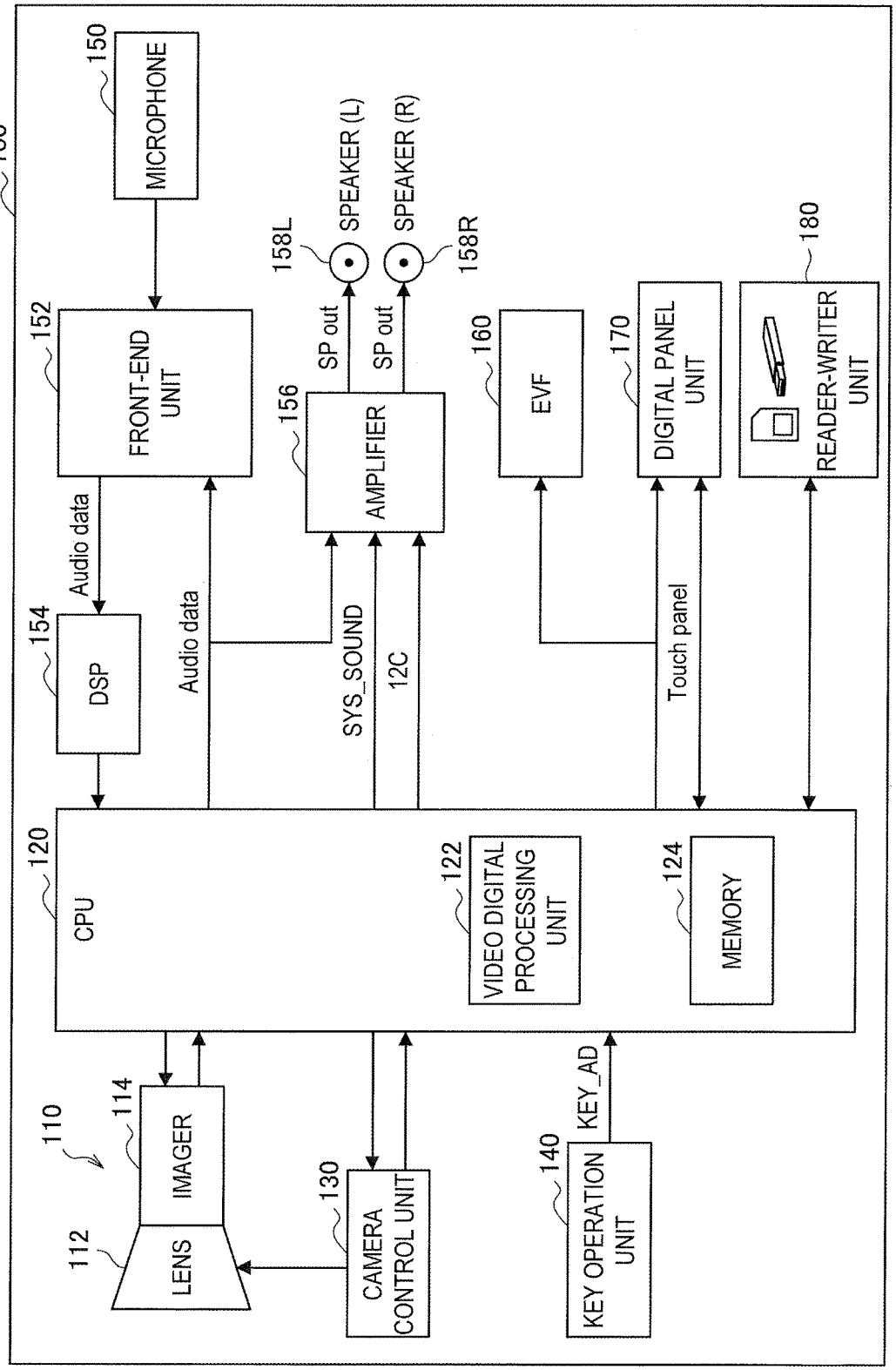
FIG. 1 is a block diagram showing a configuration of an imaging device which includes a display control device according to an embodiment of the present disclosure.

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

Note that description will be provided in the following order.

1. Configuration of an Imaging Device
2. Configuration of a Functional Unit Which Performs Display Control
3. Display Control Process
3-1. Basic Process
3-2. Operation for Sub-screen
(1) Size Change of the Sub-screen
(2) Movement of a Display Position of the Sub-screen
3-3. Display of a Plurality of Sub-screens by Multi-Touch <1. Configuration of an Imaging Device>

First, a configuration of an imaging device 100 will be described as one example of a device which includes a display control device according to an embodiment of the present disclosure with reference to FIG. 1. Note that, FIG. 1 is a block diagram showing a configuration of an imaging device 100 which includes a display control device according to an embodiment of the present disclosure.

The display control device according to the present embodiment performs a process for displaying a sub-screen in which a portion of an input image (a partial image displayed in a partial region) displayed on a display plane is enlarged and displayed. In this case, the display control device displays the sub-screen over the input image in a superimposing manner so as not to overlap with the partial region of the input image. With the display control of the display control device in this manner, a user can visually recognize an enlarged partial region and the periphery thereof at the same time.

The display control device according to the present embodiment can be applied to equipment which includes a display device, and application to, for example, a display of a personal computer, a television, a smartphone, a tablet terminal, a digital camera, and the like is considered. Hereinafter, a case in which the display process by the display control device is applied to an imaging device such as a digital camera will be described as an example. The imaging device 100 performs a focusing operation with ease by performing, for example, a display process in which a focus target is enlarged.

The imaging device 100 according to the present embodiment is a device such as a digital camera which acquires still images and moving images. The imaging device 100 includes a baseband CPU 120 which performs an image process, a video and audio input/output process, a key input process, a video output process to a panel and an EVF, a process for a touch panel mounted in a panel, and a reading and writing process of a recording medium. As shown in FIG. 1, for example, the imaging device 100 includes an image acquisition unit 110, the CPU 120, a camera control unit 130, and a key operation unit 140. In addition, the imaging device 100 includes a microphone 150, a front-end unit 152, a DSP (Digital Signal Processor) 154, an amplifier 156, and speakers 158L and 158R to perform an audio input/output process. Further, the imaging device 100 includes an EVF (electric view finder) 160, a digital panel unit 170, and a reader-writer unit 180.

The image acquisition unit 110 includes an imager 114 which is a semiconductor element that converts the intensity of light taken from a lens 112 into electric signals. A RAW image taken by the image acquisition unit 110 undergoes cropping by an imager control unit (not shown) so as to have a proper image size, and then is output to the CPU 120.

The CPU 120 controls each functional unit provided in the imaging device 100 so as to perform an image process, a video and audio input/output process, a key input process, a video output process to a panel and an EVF, a touch panel process, and a reading/writing process for a recording medium. The CPU 120 has a video digital processing unit 122 to be described later, a memory 124 in which information necessary during execution of various control processes is temporarily stored, and the like. For the imaging device according to the present embodiment, the video digital processing unit 122 has a function as a display processing device. Details of the display process by the video digital processing unit 122 will be described later.

The camera control unit 130 is a control unit that receives control information of the image acquisition unit 110 from the CPU 120 to control driving of the image acquisition unit 110. The camera control unit 130 controls various camera manual operations including, for example, focus, iris, exposure, shutter speed, gain, and ISO.

The key operation unit 140 is one of operation input units for operating the imaging device 100. The key operation unit 140 has, for example, a shutter key for starting and stopping recording, and photographing of still images of AE/AF lock, capturing, or the like, and upper, lower, right, and left keys used in an operation of a menu, or the like. In addition, the key operation unit 140 has keys for focusing, iris, exposure, shutter speed, gain, and ISO for camera manual operations, and a manual dial key for simplifying setting values during such manual operations, and enlargement focusing key. Input information (KEY_AD) from the key operation unit 140 is input to the CPU 120, and the CPU 120 controls each functional units of the imaging device 100 based on the input information from the key operation unit 140.

With regard to a functional unit that performs the audio input/output process, first, the microphone 150 is an audio input unit that acquires sound with images, and is, for example, a built-in microphone mounted in the imaging device 100. Input audio signals acquired by the microphone 150 undergo an audio process in the front-end unit 152, and then output to the DSP 154. The DSP 154 converts an input audio signal that is an analog signal into a digital signal so as to output the signal to the CPU 120. On the other hand, when sound is to be output, an output audio signal is output from the CPU 120 to the amplifier 156. The output audio signal includes an audio signal (Audio Data), system sound (SYS_SOUND) that is an audio signal generated in the CPU 120, and a rectangular wave signal (12C) as beep sound. The amplifier 156 outputs the output audio signal that has been input to the speakers 158L and 158R which are one kind of output devices that output sound externally.

The EVF 160 is a small-sized display on which the same image as that to be actually photographed is displayed, and provided in the portion of a finder. The EVF 160 displays an image signal input from the CPU 120.

The digital panel unit 170 includes a display unit (reference numeral 172 of FIG. 2) that displays an image signal from the CPU 120, an input detection unit (reference numeral 174 of FIG. 2) that detects contact (or furthermore approach) with the display plane of the display unit, and a touch panel control unit that controls a touch panel. The display unit is one of output units that display an image based on an image signal, and for example, a liquid crystal display, an organic EL display, or the like is used. The input detection unit is a sensor that can detect contact or approach of an input object such as a finger with the display plane of the display unit, and an electrostatic capacitance-type touch sensor, or the like can be used. The touch panel control unit converts a position on the display plane with which the input object comes into contact into coordinates, and notifies the CPU 120 of the converted coordinates. The CPU 120 specifies operation details that a user performed based on display details of the display unit and the notified coordinate information to control each functional unit.

The reader-writer unit 180 records audio signals and image signals output from the CPU 120 on a recording medium as data. In addition, the reader-writer unit 180 reads the data recorded on the recording medium so as to output the data to the CPU 120. The CPU 120 outputs the read data to the display unit of the digital panel unit 170 and the speakers 158L and 158R so as to reproduce the data.

<2. Configuration of a Functional Unit which Performs Display Control>

When a photographing target is photographed, the imaging device 100 according to the present embodiment displays an acquired image being photographed on the EVF 160 or the display unit of the digital panel unit 170. In this case, in order to make work of focusing the photographing target easy, the image being photographed is displayed on the display unit of the digital panel unit 170 and a portion of the image is enlarged and displayed. Accordingly, a user can closely check the state of focusing the photographing target, and is thereby able to acquire a desired image.

Figure 2:
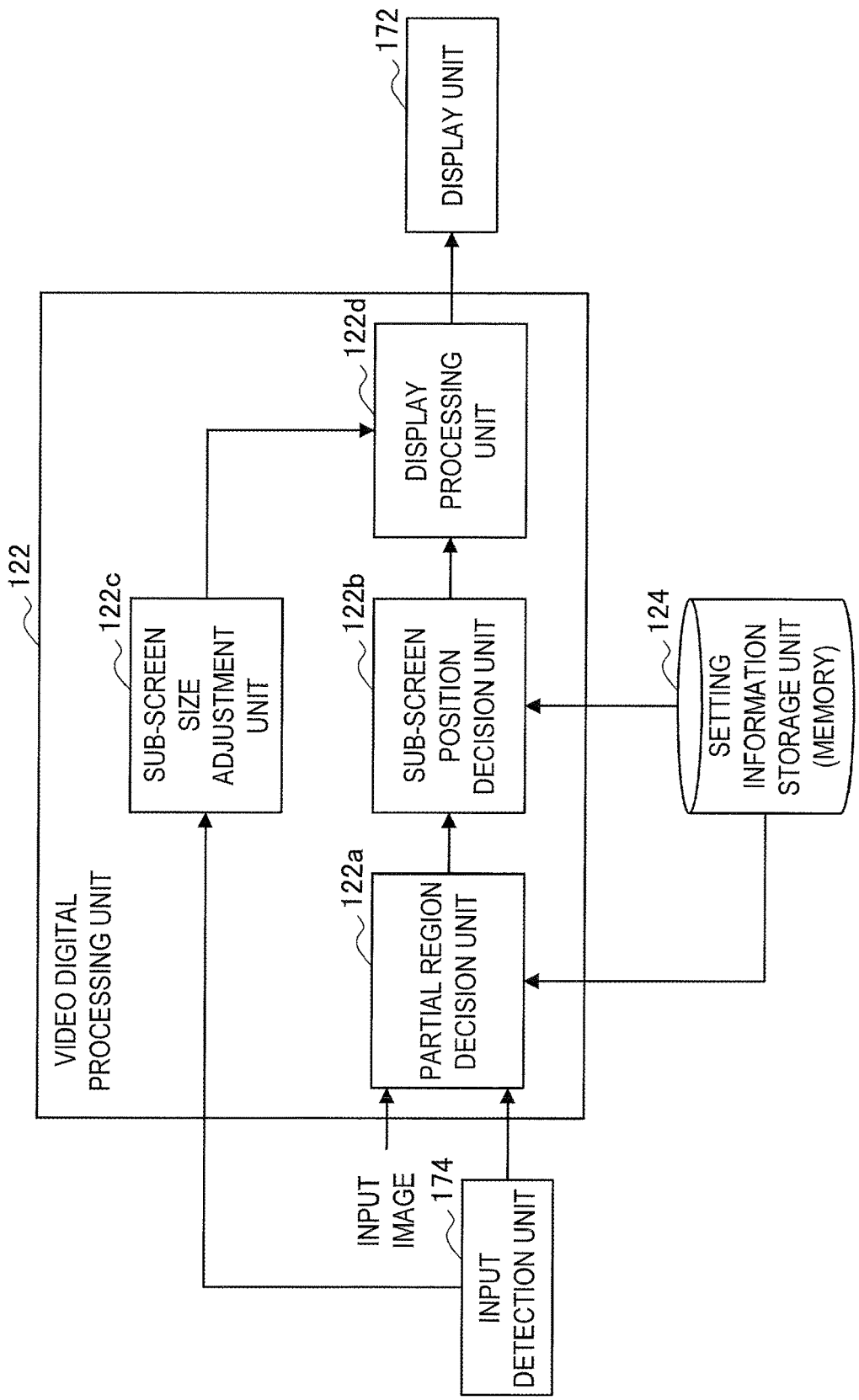
FIG. 2 is a functional block diagram showing a functional configuration of a video digital processing unit which functions as the display control device which performs display control of a digital panel unit according to the embodiment of the present disclosure.

FIG. 2 shows a functional configuration of the video digital processing unit 122 that functions as a display control unit performing display control of the digital panel unit 170. As shown in FIG. 2, the video digital processing unit 122 includes a partial area decision unit 122a, a sub-screen position decision unit 122b, a sub-screen size adjustment unit 122c, and a display processing unit 122d, and functioning of the units enables display control of the digital panel unit 170.

The partial region decision unit 122a decides a partial region to be displayed in an enlarged manner for an image (input image) that is being photographed by the image acquisition unit 110 and displayed on the display unit 172 of the digital panel unit 170 based on a detection result of the input detection unit 174 of the digital panel unit 170. When the input detection unit 174 acquires a position (touch position) with which a user brings his or her finger into contact on the display plane of the display unit 172, the partial region decision unit 122a decides a partial region to be displayed in an enlarged manner based on the touched position. When the partial region is decided, the partial region decision unit 122a notifies the sub-screen position decision unit 122b of information that identifies the decided partial region.

The sub-screen position decision unit 122b decides a display position of a sub-screen in which an input image (partial image) within the partial region decided by the partial region decision unit 122a is displayed in an enlarged manner. The sub-screen position decision unit 122b decides the display position of the sub-screen so as not to overlap with the partial region of the input image. When the display position of the sub-screen is decided, the sub-screen position decision unit 122b notifies the display processing unit 122d of the display position of the sub-screen.

When an operation input to change the size of the sub-screen displayed on the display unit 172 is performed, the sub-screen size adjustment unit 122c changes the size of the sub-screen based on the operation input. The sub-screen size adjustment unit 122c notifies the display processing unit 122d of the changed size of the sub-screen.

The display processing unit 122d performs a display process for an image (input image) displayed on the display unit 172 being photographed and another display process for a sub-screen. The display processing unit 122d displays a sub-screen on the display unit 172 based on, for example, a display position of the sub-screen notified from the sub-screen position decision unit 122b. In addition, the display processing unit 122d changes the size of the sub-screen displayed on the display unit 172 so that the size is enlarged or reduced based on size change information of the sub-screen notified of by the sub-screen size adjustment unit 122c. The display processing unit 122d causes an image that has undergone the display process to be displayed on the display unit 172.

Note that, the memory 124 of the CPU 120 can also store various kinds of setting information for displaying a sub-screen in which a portion of an input image is displayed in an enlarged manner on the display unit 172. The memory 124 can store, for example, the default size of a sub-screen, an initial display position, and the like. Referring to the memory 124 in which such information is stored, the partial region decision unit 122a decides a partial region, and the sub-screen position decision unit 122b decides a display position of a sub-screen.

<3. Display Control Process>
[3-1. Basic Process]

Figure 3:
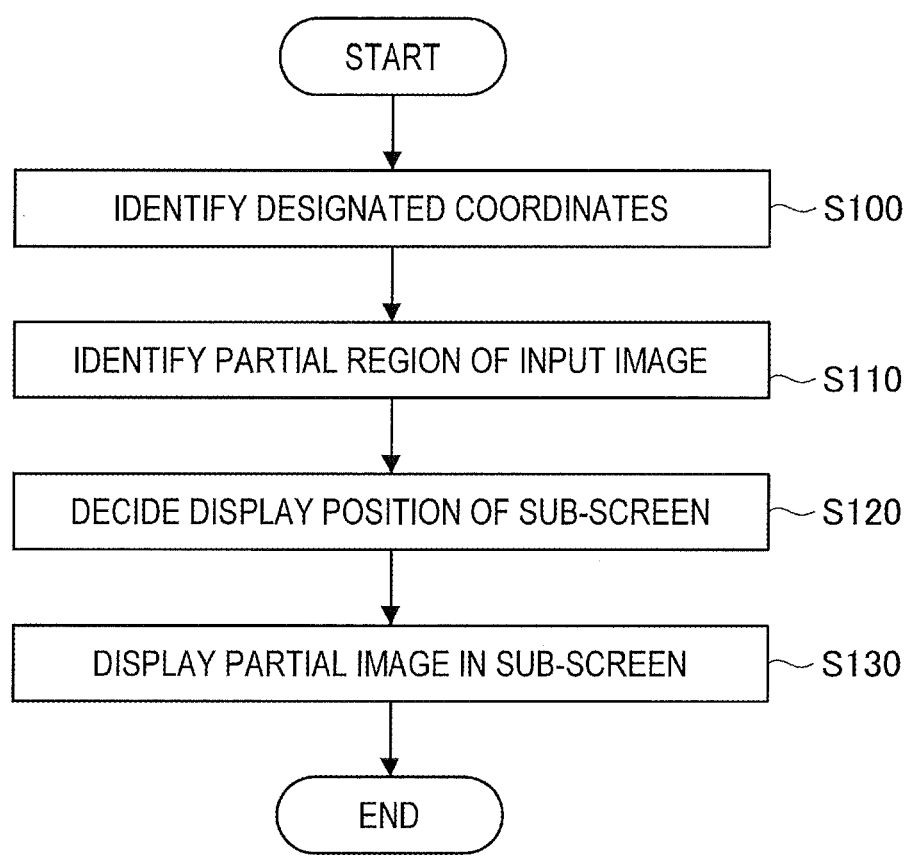
FIG. 3 is a flowchart showing a display process according to the embodiment of the present disclosure.
Figure 4:
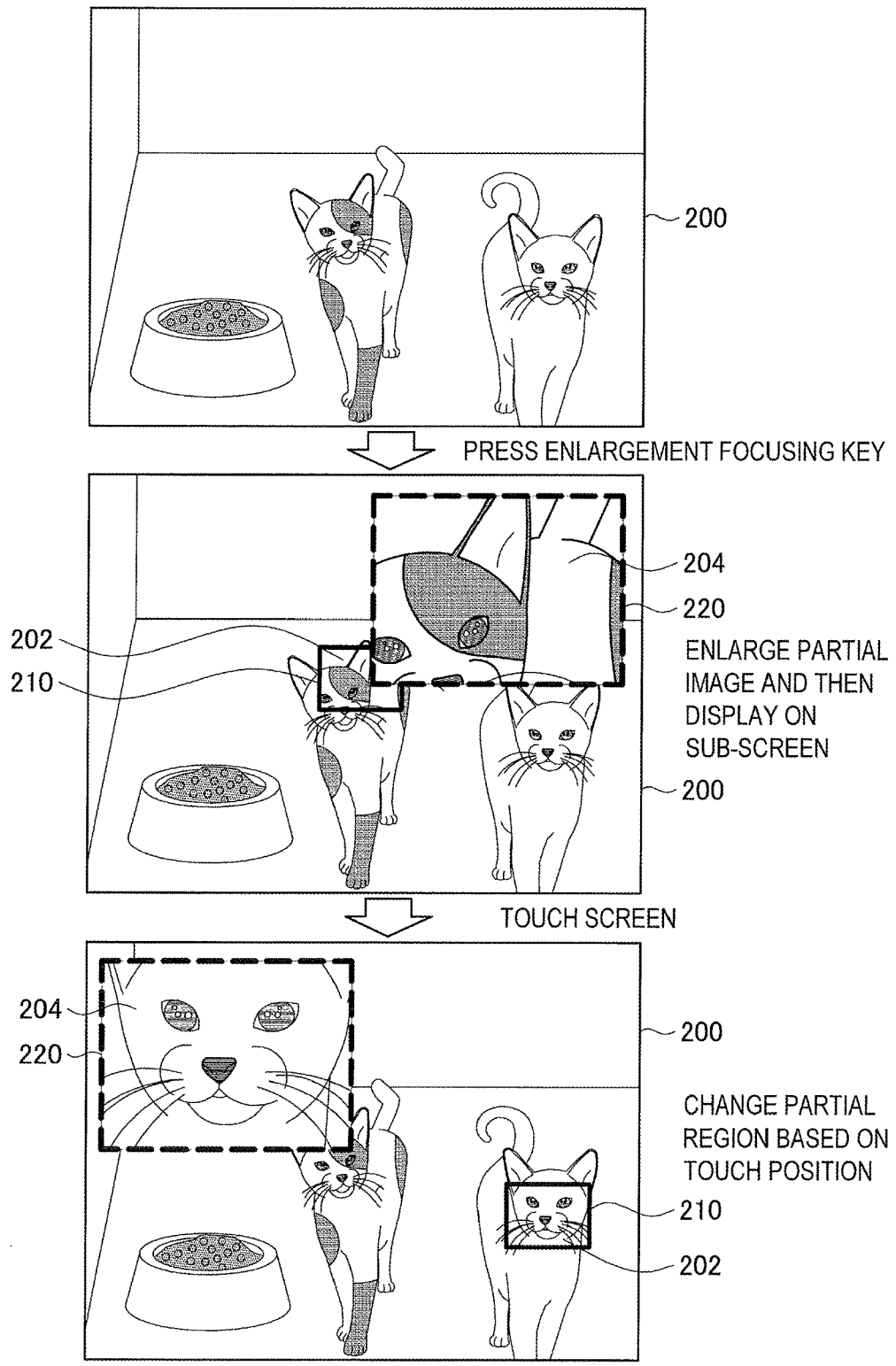
FIG. 4 is an illustrative diagram showing a process for displaying a sub-screen in which a partial image in a partial region of an input image is displayed in an enlarged manner based on the display process shown in FIG. 3.
Figure 5:
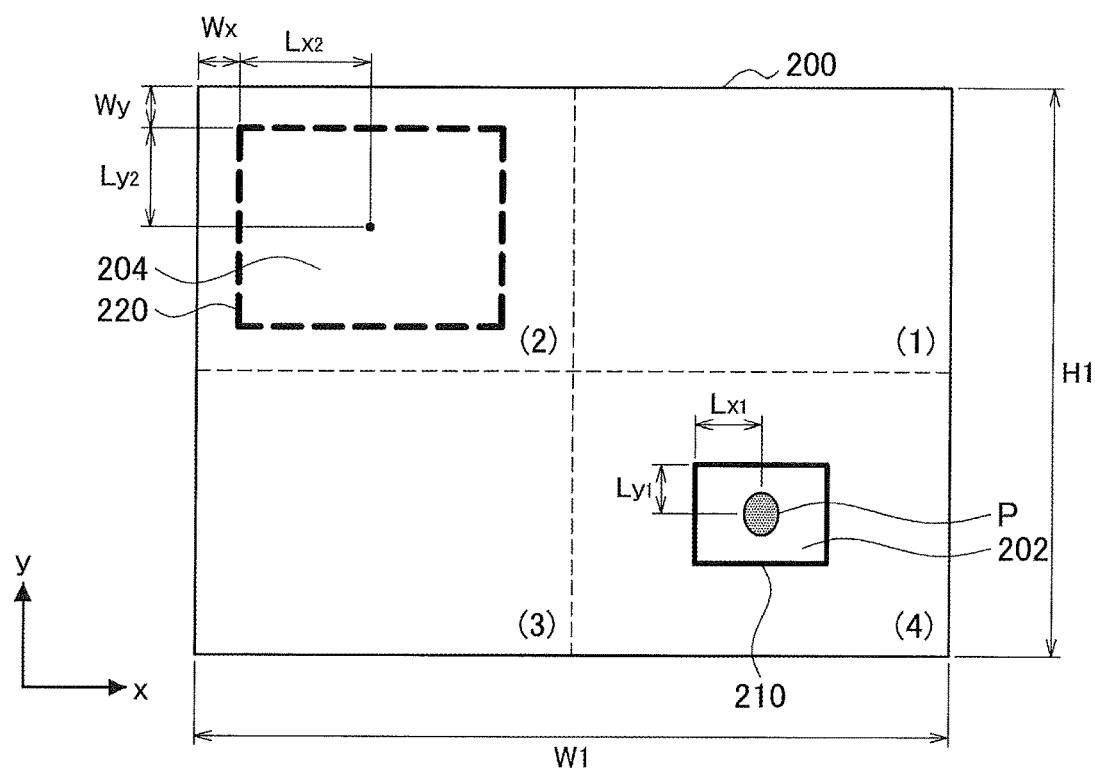
FIG. 5 is an illustrative diagram for describing sizes of the partial region and the sub-screen, and the display position relationship thereof.

Based on FIGS. 3 to 5, a display process by the video digital processing unit 122 shown in FIG. 2 will be described. Note that, FIG. 3 is a flowchart showing a display process according to the embodiment. FIG. 4 is an illustrative diagram showing a process for displaying a sub-screen in which a partial image in a partial region of an input image is displayed in an enlarged manner based on the display process shown in FIG. 3. FIG. 5 is an illustrative diagram for describing sizes of the partial region and the sub-screen, and the display position relationship thereof.

A display control process according to the present embodiment can be applied to an enlargement display function in which a partial image of an arbitrary region of an input image that is displayed on the display unit 172 is displayed in an enlarged manner in the imaging device 100 as described above. Particularly, when the input image is an image being photographed by the image acquisition unit 110, the function can be used in focusing an imaging target, and the function in this case is called an enlargement focusing function. A case to which the enlargement focusing function is applied will be described below.

The execution of the enlargement focusing function can start using the enlargement focusing key for starting the enlargement focusing function provided in, for example, the key operation unit 140. When the enlargement focusing key is pressed by a user, the CPU 120 causes the imaging device 100 to be in an enlargement focusing mode. At this moment, an OSD (On Screen Display) for notifying the user of the enlargement focusing mode may be displayed on the display unit 172. As the OSD, for example, the phrase "enlargement focusing" or an icon indicating the enlargement focusing mode, or the like is considered.

When the imaging device 100 starts the function in the enlargement focusing mode, the video digital processing unit 122 first identifies designated coordinates of an input image (S100). A partial region serves to define a portion of the input image displayed in a sub-screen in an enlarged manner, and a partial image of the input image to be included in the partial region is called a partial image. Since the partial region is decided based on designated coordinates indicating a position designated in the input image, the designated coordinates are first identified in Step S100. When, for example, designated coordinates that have been finally designated in the previous enlargement focusing mode are recorded in the memory 124, the corresponding coordinates are set to be designated coordinates. In addition, when there is no history information of designated coordinates, for example, the center of a screen of the display unit 172 can be set to be designated coordinates.

When designated coordinates are identified, the partial region decision unit 122a identifies a partial region of the input image (S110). The size of the partial region that identifies a partial image of the input image can be set in advance, and stored in the memory 124 as setting information. The partial region decision unit 122a identifies the partial region of the input image based on the designated coordinates and the size of the partial region.

As shown in FIG. 5, for example, it is assumed that there are an input image 200 displayed on the display unit 172, a partial region 210 that defines a portion of the input image 200, and a sub-screen 220 in which a partial image 202 in the partial region 210 is displayed in an enlarged manner. In the sub-screen 220, an image obtained by displaying the partial image 202 in an enlarged manner is set to be an enlarged image 204. When, for example, a user designates a position of the input image by bringing his or her finger into contact with a display plane of the display unit 172, the partial region decision unit 122a identifies the partial region 210 having a touch position P of the finger as designated coordinates. In the present embodiment, the partial region 210 is set to be ⅛ of the size of the input image 200 displayed on the display unit 172.

When the partial region 210 of the input image 200 is identified in Step S110, the sub-screen position decision unit 122b decides the display position of the sub-screen 220 in which the partial image 202 of the partial region 210 is displayed in an enlarged manner (S120). The sub-screen position decision unit 122b decides the display position of the sub-screen 220 so as not to overlap with the partial region 210 of the input image 200 with the sub-screen 220 in which the partial image 202 of the partial region 210 is displayed in an enlarged manner.

As shown in FIG. 5, for example, the input image 200 is divided into four in such a way that the centers of the sides of the input image 200 facing each other are connected in straight lines so that the sub-screen 220 is disposed in an area different from the partial region 210. In the example of FIG. 5, because the partial region 210 is disposed in a fourth area, the sub-screen 220 is disposed in any of first to third areas (a second area in FIG. 5). At this moment, by displaying the sub-screen 220 in a position most distant from the partial region 210, the possibility of overlapping the partial region 210 with the sub-screen 220 becomes low.

The size of the sub-screen 220 is set to be, for example, ¼ of the size of the input image 200. In addition, the sub-screen 220 may be disposed by providing a predetermined margin ($w_x$, $w_y$) from corners of the input image 200 so that the sub-screen 220 falls within the display region of the display unit 172. The margin ($w_x$, $w_y$) may be set to about, for example, 10×10 pixels.

When the display position of the sub-screen 220 is decided in Step S120, the display processing unit 122d causes the enlarged image 204 of the partial image 202 to be displayed in the sub-screen 220 (S130). In the enlargement focusing mode, an image being photographed corresponding to a region of which the size is set to be n times (for example, two times) the partial region 210 identified with the coordinates of the touch position P (designated coordinates) is acquired from the image acquisition unit 110. Then, the image cut out from the imager 114 is displayed in the sub-screen 220, and superimposed on the input image 200 displayed on the display unit 172. By acquiring the enlarged image 204 of the sub-screen 220 in this manner, deterioration of image quality of the enlarged image 204 can be prevented, and a focus state of the sub-screen 220 can be reliably checked.

For example, the size of a display region of the display unit 172 is set to W1×H1, and the size of the imager 114 is set to W2×H2. In this case, the relationship between the coordinates (X1, Y1) of the touch position P on the display region of the display unit 172 and the coordinates (X2, Y2) on the imager 114 is as follows.

$$X2=(W2/W1)*X1$$

$$Y2=(H2/H1)*Y2$$

As an example, a size of the display region of the display unit 172 is set to 640×480 pixels, and the size of the imager 114 is set to 3000×2000 pixels. In this case, when the coordinates of the touch position P on the display region of the display unit 172 are (500, 300), the coordinates on the imager 114 are as follows.

$$X2=(3000/640)*500=2343$$

$$Y2=(2000/480)*300=1250$$

The display processing unit 122d cuts out from the imager 114 an image in the same size as that of the sub-screen 220 based on the coordinates (X2, Y2) on the imager 114 computed as above so as to be displayed in the sub-screen 220. By acquiring the enlarged image 204 of the sub-screen 220 in this manner, deterioration of image quality of the enlarged image 204 can be prevented, and a focus state of the sub-screen 220 can be reliably checked.

After the sub-screen 220 is displayed in Step S130, if an input object is brought into contact with a region other than the partial region 210 that is currently enlarged, the current partial region 210 is cancelled. Then, the partial region decision unit 122a sets the partial region 210 again based on designated coordinates which are newly designated by the contact of the input object on the display plane. Then, the sub-screen position decision unit 122b decides the display position of the sub-screen 220 for displaying the enlarged image 204 of the partial image 202 so as not to overlap with the partial region 210, and to be displayed on the display unit 172. With the process as described above, a user can view the enlarged image 204 of the partial region 210 including an arbitrary position of the input image 200.

In addition, the partial region 210 can be configured to be moved in an operation in which a finger is brought into contact with the current partial region 210, the partial region 210 is moved to a desired position in the contact state, and then the finger is separated, i.e. a so-called drag operation. In this case, based on a detection result of the input detection unit 174, the movement of the finger can be recognized. Then, the partial region decision unit 122a sets the partial region 210 to be in the position to which the finger moves. When the partial region 210 is moved, the sub-screen position decision unit 122b decides a display position of the sub-screen 220 based on the moved partial region 210. Then, the display processing unit 122d causes the sub-screen 220 to be moved based on a notification of the sub-screen position decision unit 122b and obtains the enlarged image 204 again so as to be displayed in the sub-screen 220.

Accordingly, it is possible to perform fine adjustment of the partial region 210 that is desired to be focused while the enlargement focusing operation is continued, and accordingly, reliable focusing for a photographing target is possible with a small number of operation steps.

Further, when a display end operation of the sub-screen 220 is performed, display of the sub-screen 220 ends. As the display end operation, for example, a tapping operation on the sub-screen 220 displayed on the display unit 172 can be set. In this case, when the tapping operation performed by a user on the sub-screen 220 is recognized based on a detection result of the input detection unit 174, the display processing unit 122d sets the sub-screen 220 on the display unit 172 not to be displayed. When the sub-screen 220 is set not to be displayed, the enlargement focusing mode may be set to end.

Hereinabove, based on FIG. 3, the display control process by the video digital processing unit 122 according to the present embodiment which functions as a display control device has been described. Herein, the way that the input image 200 and the sub-screen 220 are displayed on the display unit 172 in the display control process of FIG. 3 will be described based on FIG. 4. The upper drawing of FIG. 4 shows a state in which an image being captured (input image 200) is displayed on the display unit 172 before the enlargement focusing mode. If a user presses the enlargement focusing key of the key operation unit 140 in this state, the imaging device 100 functions in the enlargement focusing mode.

As shown in the central drawing of FIG. 4, a frame indicating the partial region 210 which identifies the partial image 202 that is a portion of the input image 200 is displayed based on the designated coordinates of the input image 200 in the enlargement focusing mode. In addition, the enlarged image 204 of the partial image 202 is displayed in the sub-screen 220 so as not to overlap with the partial region 210. The sub-screen 220 is indicated by a dashed-lined frame. Note that, although a portion of the partial region 210 overlaps with a portion of the sub-screen 220 in the central drawing of FIG. 4, these are disposed so as to be farthest away from each other within the display region of the display unit 172. Even though the portions overlap in this manner, the whole image of the input image can be recognized.

If contact of an input object is detected in a region of the input image 200 other than in the current partial region 210 from the state of the central drawing of FIG. 4, the partial region 210 is set again based on a new touch position P as illustrated in the lower drawing of FIG. 4. Then, the enlarged image 204 of the partial image 202 is displayed on the input image 200 in a superimposing manner so as not to overlap with the partial region 210.

[3-2. Operation for the Sub-screen]

(1) Size Change of the Sub-screen

A size of the sub-screen 220 in which the partial image 202 in the partial region 210 of the input image 200 is displayed in an enlarging manner is set in advance, but the size of the sub-screen 220 can be changed in an operation of a user after display of the sub-screen 220. The size of the sub-screen 220 can be instantaneously changed using, for example, a pinch-open operation in which two fingers are brought into contact with the display plane of the display unit 172 and then separated, or a pinch-close operation in which two fingers are conversely brought to approach each other. A size change of the sub-screen 220 using such operations will be described based on FIG. 6.

Figure 6:
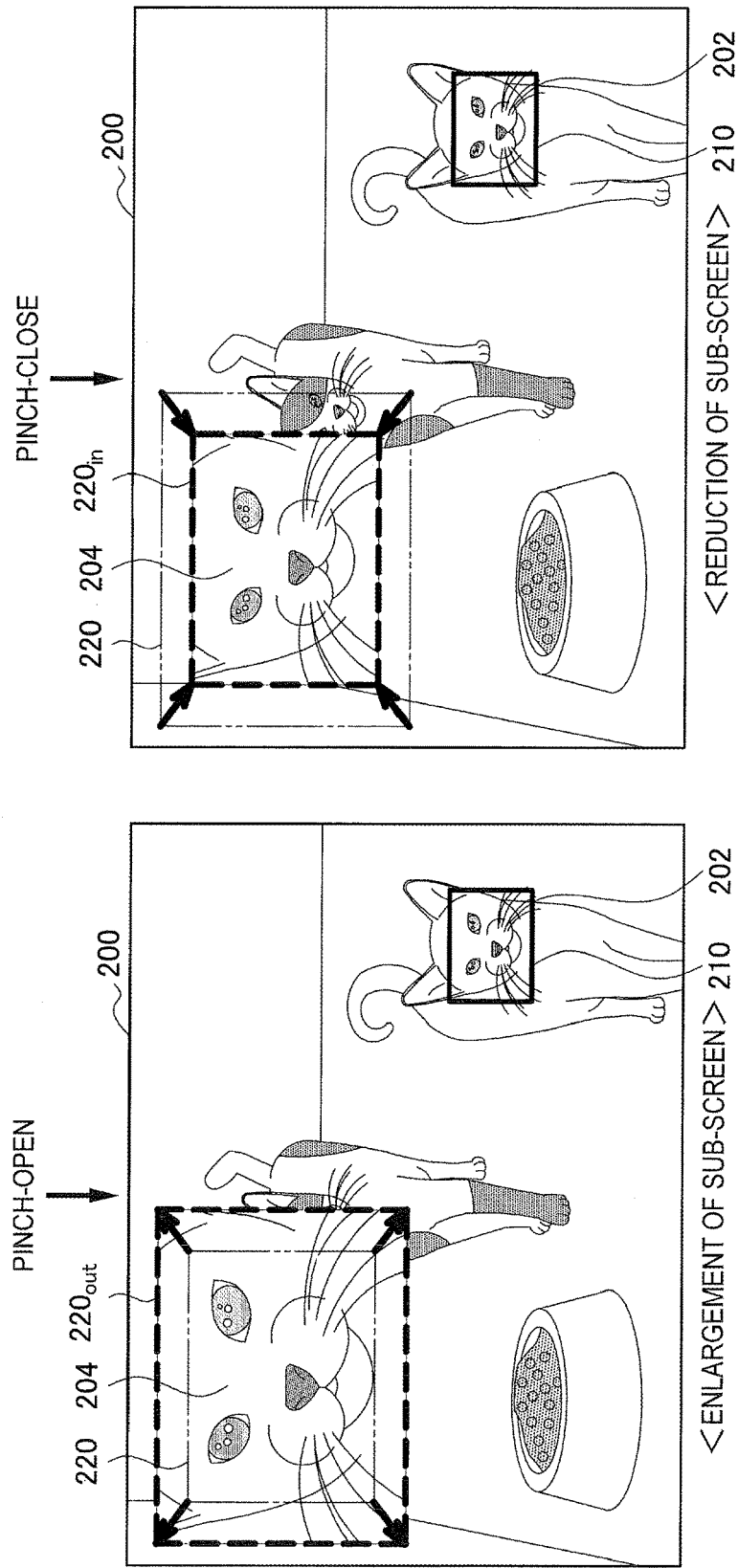
FIG. 6 is an illustrative diagram for describing a size change process of the sub-screen.

The left drawing of FIG. 6 shows a process in which the sub-screen 220 is enlarged in a pinch-open operation. If a user brings his or her fingers into contact with the sub-screen 220 that is currently displayed and then separates them, the sub-screen 220 prior to the operation is enlarged to the region indicated by reference numeral 220 out. On the other hand, the right drawing of FIG. 6 shows a process in which the sub-screen 220 is reduced in a pinch-close operation. If a user brings his or her fingers into contact with the sub-screen 220 that is currently displayed and causes them to approach each other, the sub-screen 220 prior to the operation is reduced to the region indicated by reference numeral 220 in.

The operations are performed by the sub-screen size adjustment unit 122c shown in FIG. 2. The sub-screen size adjustment unit 122c recognizes the pinch-open operation and the pinch-out operation based on detection results of the input detection unit 174, and decides a size of the sub-screen 220 according to an amount of the operations. Then, the sub-screen size adjustment unit 122c notifies the display processing unit 122d of the decided size, and the display processing unit 122d changes the size of the sub-screen 220 so as to be the notified size and then to be displayed on the display unit 172. In this manner, by making the size of the sub-screen 220 changeable, it is possible to ascertain a focus state in more detail by enlarging the sub-screen 220, or to visually check the whole image of the input image 200 by reducing the sub-screen 220 with ease.

(2) Movement of a Display Position of the Sub-screen

A display position of the sub-screen 220 is decided by the sub-screen position decision unit 122b based on designated coordinates, but can also be moved by a user after display of the sub-screen 220. The sub-screen 220 can be configured to be moved in an operation in which a finger is brought into contact with the sub-screen 220 displayed on the display unit 172, then moves the sub-screen 220 to a desired position in the contacting state, and separates therefrom, which is known as a drag operation.

In this case, movements of a finger can be recognized based on detection results of the input detection unit 174. Then, the sub-screen position decision unit 122b notifies the display processing unit 122d so as to display the sub-screen 220 at a position to which the finger is moved, and the display processing unit 122d moves the sub-screen 220 based on the notification of the sub-screen position decision unit 122b. When the finger is separated from the display plane, the display position of the sub-screen 220 is fixed to the position at which the finger is separated.

In this manner, by making a display position of the sub-screen 220 changeable, a portion of the input image 200 that is superimposed by the sub-screen 220 can also be visible.

[3-3. Display of a Plurality of Sub-screens by Multi-Touch]

Hitherto, the case in which only a portion of the input image 200 is enlarged so as to be displayed in the sub-screen 220 has been described, but the present technology can cause a plurality of portions of the input image 200 to be respectively displayed in sub-screens 220. In this case, the input detection unit 174 is set to be able to recognize contact positions of a plurality of input objects.

Even when a plurality of sub-screens 220 for a plurality of partial regions 210 of the input image 200 are to be displayed, each of the partial regions is identified based on designated coordinates, and display positions of the sub-screens 220 are decided so as not to overlap with those of the partial regions in the same manner as in the process of FIG. 3 described above. Herein, there is a possibility that, when the plurality of sub-screens 220 are displayed, the sub-screens 220 overlap with each other, or the sub-screens 220 overlap with other partial regions. Thus, a display process of the sub-screens 220 is performed so that the partial regions 210 do not overlap with the sub-screens 220 corresponding thereto, and the entire input image 200 can also be visible.

Figure 7:
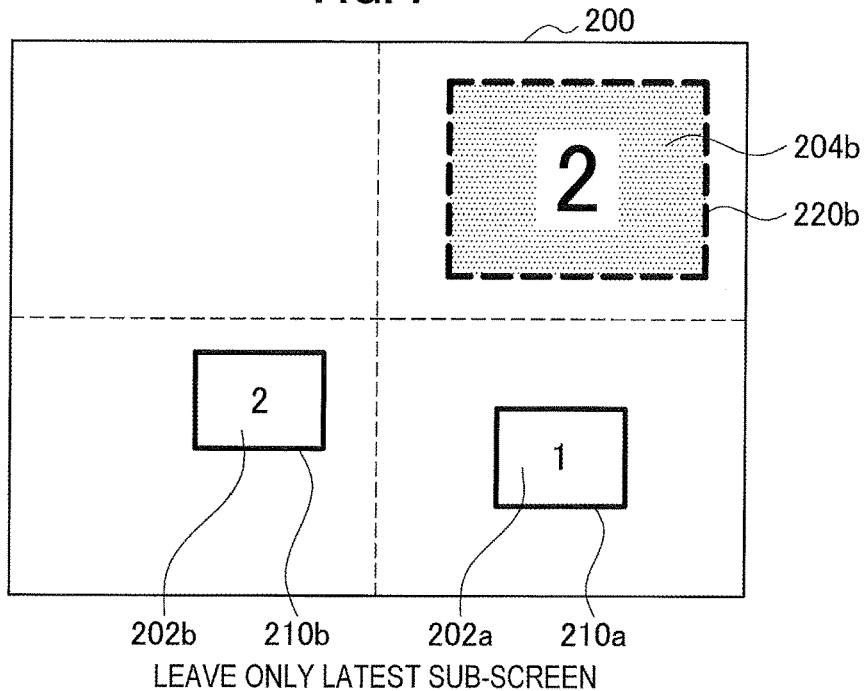
FIG. 7 is an illustrative diagram showing an example of a sub-screen display process using multi-touch.

As shown in FIG. 7, for example, when there are a plurality of touch positions at which a user brings his or her finger into contact with the display plane of the display unit 174 a plurality of times, only the sub-screen 220 may be configured to be displayed based on the latest touch position. It is assumed that, for example, there are a first partial region 210a based on a first touch position and a second partial region 210b based on a second touch position. In this case, the sub-screen corresponding to the partial image 202a of the first partial region 210a is displayed until the second region 210b is identified. Then, when the second partial region 210b is identified, the sub-screen corresponding to the first partial region 210a is not displayed, and a sub-screen 220b displaying an enlarged image 204b of a partial image 202b in the second partial region 210b is displayed.

In this manner, by displaying only the sub-screen 220 based on the latest touch position, it is possible to lower the possibility the sub-screens 220 overlapping with each other or the sub-screen 220 overlapping with the partial region 210.

Figure 8:
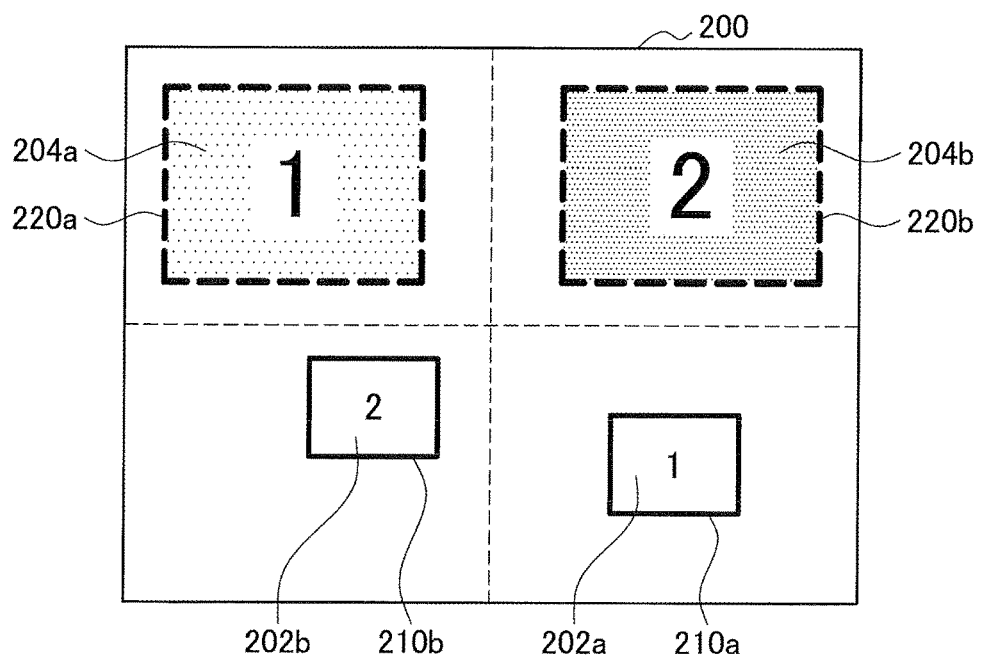
FIG. 8 is an illustrative diagram showing another example of the sub-screen display process by multi-touch.

In addition, as shown in FIG. 8, for example, when there are a plurality of touch positions at which a user brings his or her finger into contact with the display plane of the display unit 174 a plurality of times, an enlarged image to be displayed in a sub-screen 220 other than the sub-screen 220 based on the latest touch position may be configured to be displayed in a transparent manner. It is assumed that, for example, there are the first partial region 210a based on the first touch position and the second partial region 210b based on the second touch position. In this case, an enlarged image 204a of a sub-screen 220a corresponding to the partial image 202a of the first partial region 210a is displayed as usual before the second region 210b is identified.

Then, when the second partial region 210b is identified, transparency of the enlarged image 204a of the sub-screen 220a corresponding to the first partial region 210a is increased so that the input image 200 disposed behind the sub-screen 220a is seen due to the transparency. Then, a sub-screen 220b in which an enlarged image 204b of the partial image 202b in the second partial region 210b is displayed is displayed. The enlarged image 204b of the sub-screen 220b is displayed as usual.

In this manner, by displaying the enlarged image displayed in the sub-screen 220 rather than another sub-screen 220 based on the latest touch position in a transparent manner, the input image 200 disposed behind the sub-screen 220 that is not by the latest touch can be visible even when a plurality of sub-screens 220 are displayed. In this case, the plurality of sub-screens 220 can be displayed on the display unit 172 and a user can simultaneously check focus states of the plurality of sub-screens 220. Note that, if the plurality of sub-screens 220 are displayed in an overlapping manner, the display of the latest sub-screen 220 can be checked in detail in such a way that the sub-screen 220 displayed most recently is displayed in the front.

Hereinabove, the configuration of the imaging device 100 according to the present embodiment and the process in which the enlarged image 204 of the partial region 210 of the input image 200 is displayed in the sub-screen 220 by a display control function have been described. According to the present technology, when an arbitrary position in the input image 200 designated by a user is enlarged and displayed as the sub-screen 220, the sub-screen 220 is disposed in a position away from the designated position so as not to thoroughly overlap with the partial region 210. Accordingly, a user can check the focus state of a predetermined position while simultaneously checking the entire composition, and accordingly, focusing work becomes easy.

In addition, in the enlargement focusing mode, the partial region 210 that is an enlargement target can be displaced to an arbitrary position by being dragged, or fine adjustment of the partial region 210 that is desired to be focused can be performed while an enlargement focusing operation is continued. Thus, focusing of a photographing target can be reliably performed in a small number of operation steps.

Although the preferred embodiments of the present disclosure have been described in detail with reference to the appended drawings, the present disclosure is not limited thereto. It is obvious to those skilled in the art that various modifications or variations are possible insofar as they are within the technical scope of the appended claims or the equivalents thereof. It should be understood that such modifications or variations are also within the technical scope of the present disclosure.

In the above-described embodiment, for example, the size of the partial region 210 is set to ⅛ of the size of the input image 200, and the size of the sub-screen 220 is set to ¼ of the size of the input image 200, but the present technology is not limited thereto. The sizes of the partial region 210 and the sub-screen 220 can be appropriately set.

In addition, in the above-described embodiment, the function of the display control device is provided within the CPU 120 of the imaging device 100, but the present technology is not limited thereto. For example, a display control device may be provided separate from a device having a display unit, and the display control device may perform display control of the display unit. Alternatively, the display control of the display unit may be performed in such a way that the display control function is realized by a program, and the program is executed on a server that can communicate with the device having the display unit. In addition, when the display control function is realized by the program, the program can also be provided in a recording medium on which the program can be recorded.

Additionally, the present technology may also be configured as below.

(1) A display control device including:
a display control unit that superimposes and displays a sub-screen in which a partial image displayed in a partial region of an input image displayed on a display unit is enlarged and displayed on the input image in a manner that the sub-screen does not overlap with the partial region.

(2) The display control device according to (1), further including:
a sub-screen position decision unit that decides a position in which the sub-screen is superimposed and displayed on the input image.

(3) The display control device according to (2), wherein the sub-screen position decision unit displays the sub-screen in a position most distant from the partial region.

(4) The display control device according to (2), further including:
a detection unit that detects a contact position of an input object that is contacted with the display unit,
wherein the sub-screen position decision unit decides a display position of the sub-screen based on an operation by a user which is recognized from a result of detection performed by the detection unit.

(5) The display control device according to (4), wherein the operation by the user is a drag operation in which the input object is moved in contact with the sub-screen on the display unit.

(6) The display control device according to any one of (1) to (5), wherein, when a plurality of the partial regions of the input image are present, the display control unit superimposes and displays a plurality of the sub-screens in which the respective partial images displayed in the respective partial regions are enlarged and displayed on the input image in a manner that the plurality of sub-screens do not overlap with the respective partial regions.

(7) The display control device according to (6), further including:
a detection unit that is able to detect contact positions of a plurality of input objects that are contacted with the display unit,
wherein, when the detection unit detects contacts of the plurality of input objects with the display unit, the display control unit displays only the sub-screen in which a partial image of a partial region corresponding to a contact position of one of the plurality of input objects that is finally detected is enlarged and displayed.

(8) The display control device according to (6), further including:
a detection unit that is able to detect contact positions of a plurality of input objects that are contacted with the display unit,
wherein, when the detection unit detects contacts of the plurality of input objects with the display unit, the display control unit increases transparency of the image of the sub-screen in which a partial image of a partial region corresponding to a contact position of one of the plurality of input objects other than one of the plurality of input objects that is finally detected is enlarged and displayed.

(9) The display control device according to any one of (1) to (8), further including:
a partial region decision unit that decides the partial region of the input image.

(10) The display control device according to (1), further including:
a detection unit that detects a contact position of an input object that is contacted with the display unit, wherein the partial region decision unit decides the partial region based on a touch operation of a user which is recognized from a result of detection performed by the detection unit.

(11) The display control device according to (10), wherein the partial region decision unit starts displaying the sub-screen in which the partial image displayed in the partial region is enlarged and displayed based on the touch operation of the user and continuously displays the sub-screen after the touch operation is cancelled.

(12) The display control device according to (10) or (11), wherein, when contact of the input object is detected in a region other than the partial region corresponding to the sub-screen that is currently displayed on the display unit, the partial region decision unit sets the partial region again at the contact position of the input object.

(13) The display control device according to any one of (9) to (12), wherein the partial region decision unit sets the partial region at a position that is last set based on history information of the partial region.

(14) The display control device according to any one of (1) to (13), wherein the input image is a captured image that is being captured by an imaging unit that photographs a subject.

(15) The display control device according to (14), wherein the display control unit receives focusing adjustment for a partial image that is enlarged and displayed in the sub-screen.

(16) The display control device according to (14), wherein the display control unit enlarges and displays a RAW image output from the imaging unit in the sub-screen.

(17) The display control device according to any one of (1) to (16), further including:
a sub-screen size adjustment unit that changes a size of the sub-screen.

(18) The display control device according to any one of (1) to (17), wherein the display control unit displays a frame that indicates the partial region with respect to the input image on the display unit.

The present disclosure contains subject matter related to that disclosed in Japanese Priority Patent Application JP 2012-051829 filed in the Japan Patent Office on Mar. 8, 2012, the entire content of which is hereby incorporated by reference.

What is claimed is:
1. A display control device, comprising:
a display device; and
one or more processors configured to:
control display of an input image on the display device, wherein the input image is equally divided into a plurality of areas;
detect a first contact position on the display device configured to designate first coordinates of the input image;
determine a first partial region of the input image based on the first coordinates, wherein the first partial region is in a first area of the plurality of areas;
superimpose and display a first sub-screen in which a first partial image is enlarged and displayed, wherein the first sub-screen is displayed in a second area of the plurality of areas, wherein the first sub-screen is displayed away from the first partial region, and wherein the first partial image is within the first partial region of the input image;
detect, subsequent to the detection of the first contact position, a second contact position on the display device configured to designate second coordinates of the input image;
determine a second partial region of the input image based on the second coordinates, wherein the second partial region is in a third area of the plurality of areas;
superimpose and display a second sub-screen in which a second partial image is enlarged and displayed, wherein the second sub-screen is displayed in a fourth area of the plurality of areas, wherein the second sub-screen is displayed away from the second partial region, and wherein the second partial image is within the second partial region of the input image;
increase transparency of a first image of the first sub-screen in which the first partial image of the first partial region corresponding to the first contact position is enlarged and displayed; and
control the display device to concurrently display the first image of the first sub-screen and a second image of the second sub-screen, wherein the second image is an image that lacks transparency.

2. The display control device according to claim 1, wherein the one or more processors are further configured to determine a first position of the first sub-screen, wherein the first sub-screen is superimposed and displayed at the first position on the input image.

3. The display control device according to claim 2, wherein the one or more processors are further configured to display the first sub-screen at a second position, wherein the second position of the first sub-screen is at a distance from the first partial region.

4. The display control device according to claim 2, wherein the one or more processors are further configured to:
change a display position of the first sub-screen from the first position to a second position on the display device based on an operation by a user.

5. The display control device according to claim 4, wherein the operation by the user is a drag operation, wherein in the drag operation an input object is moved in contact with the first sub-screen on the display device.

6. The display control device according to claim 1, wherein the one or more processors are further configured to detect the first contact position and the second contact position based on contact of a plurality of input objects with the display device.

7. The display control device according to claim 1, wherein the one or more processors are further configured to determine size of the first partial region and the second partial region of the input image based on a size set in advance.

8. The display control device according to claim 7, wherein the one or more processors are further configured to determine the first partial region based on a touch operation of a user.

9. The display control device according to claim 8, wherein the one or more processors are further configured to display the first sub-screen based on the touch operation of the user, and wherein the first sub-screen is continuously displayed based on a cancellation of the touch operation.

10. The display control device according to claim 8, wherein based on a detection of a contact of an input object in a region different from the first partial region, the one or more processors are further configured to set the first partial region again at a position corresponding to the contact of the input object.

11. The display control device according to claim 7, wherein the one or more processors are further configured to set the first partial region at a position that is last set based on history information of the first partial region.

12. The display control device according to claim 1, further comprising:
an imaging unit configured to capture a subject to generate the input image.

13. The display control device according to claim 12, wherein the one or more processors are further configured to receive focus adjustment for the first partial image that is enlarged and displayed in the first sub-screen.

14. The display control device according to claim 12, wherein the one or more processors are further configured to enlarge and display a RAW image output from the imaging unit in the first sub-screen.

15. The display control device according to claim 1, wherein the one or more processors are further configured to display a frame that indicates the first partial region with respect to the input image on the display device.

16. The display control device according to claim 1, wherein the one or more processors are further configured to remove the display of the first sub-screen based on the detection of the second contact position.

17. A display control method, comprising:
displaying an input image on a display device, wherein the input image is equally divided into a plurality of areas;
detecting a first contact position on the display device configured to designate first coordinates of the input image;
determining a first partial region of the input image based on the first coordinates, wherein the first partial region is in a first area of the plurality of areas;
superimposing and displaying a first sub-screen in which a first partial image is enlarged and displayed, wherein the first sub-screen is displayed in a second area of the plurality of areas, wherein the first sub-screen is displayed away from the first partial region, wherein the first partial image is within the first partial region of the input image;
detecting, subsequent to the detection of the first contact position, a second contact position on the display device configured to designate second coordinates of the input image;
determining a second partial region of the input image based on the second coordinates, wherein the second partial region is in a third area of the plurality of areas;
superimposing and displaying a second sub-screen in which a second partial image is enlarged and displayed, wherein the second sub-screen is displayed in a fourth area of the plurality of areas, wherein the second sub-screen is displayed away from the second partial region, and wherein the second partial image is within the second partial region of the input image;
increasing transparency of a first image of the first sub-screen in which the first partial image of the first partial region corresponding to the first contact position is enlarged and displayed; and
controlling the display device to concurrently display the first image of the first sub-screen and a second image of the second sub-screen, wherein the second image is an image that lacks transparency.

18. A non-transitory computer-readable medium having stored thereon computer-executable instructions which when executed by a computer, causes the computer to execute operations, the operations comprising:
displaying an input image on a display device, wherein the input image is equally divided into a plurality of areas;
detecting a first contact position on the display device configured to designate first coordinates of the input image;
determining a first partial region of the input image based on the first coordinates, wherein the first partial region is in a first area of the plurality of areas;
superimposing and displaying a first sub-screen in which a first partial image is enlarged and displayed, wherein the first sub-screen is displayed in a second area of the plurality of areas, wherein the first sub-screen is displayed away from the first partial region, and wherein the first partial image is within the first partial region of the input image;
detecting, subsequent to the detection of the first contact position, a second contact position on the display device configured to designate second coordinates of the input image;
determining a second partial region of the input image based on the second coordinates, wherein the second partial region is in a third area of the plurality of areas;
superimposing and displaying a second sub-screen in which a second partial image is enlarged and displayed, wherein the second sub-screen is displayed in a fourth area of the plurality of areas, wherein the second sub-screen is displayed away from the second partial region, and wherein the second partial image is within the second partial region of the input image;
increasing transparency of a first image of the first sub-screen in which the first partial image of the first partial region corresponding to the first contact position is enlarged and displayed; and
controlling the display device to concurrently display the first image of the first sub-screen and a second image of the second sub-screen, wherein the second image is an image that lacks transparency.

* * * * *